Figure 1:
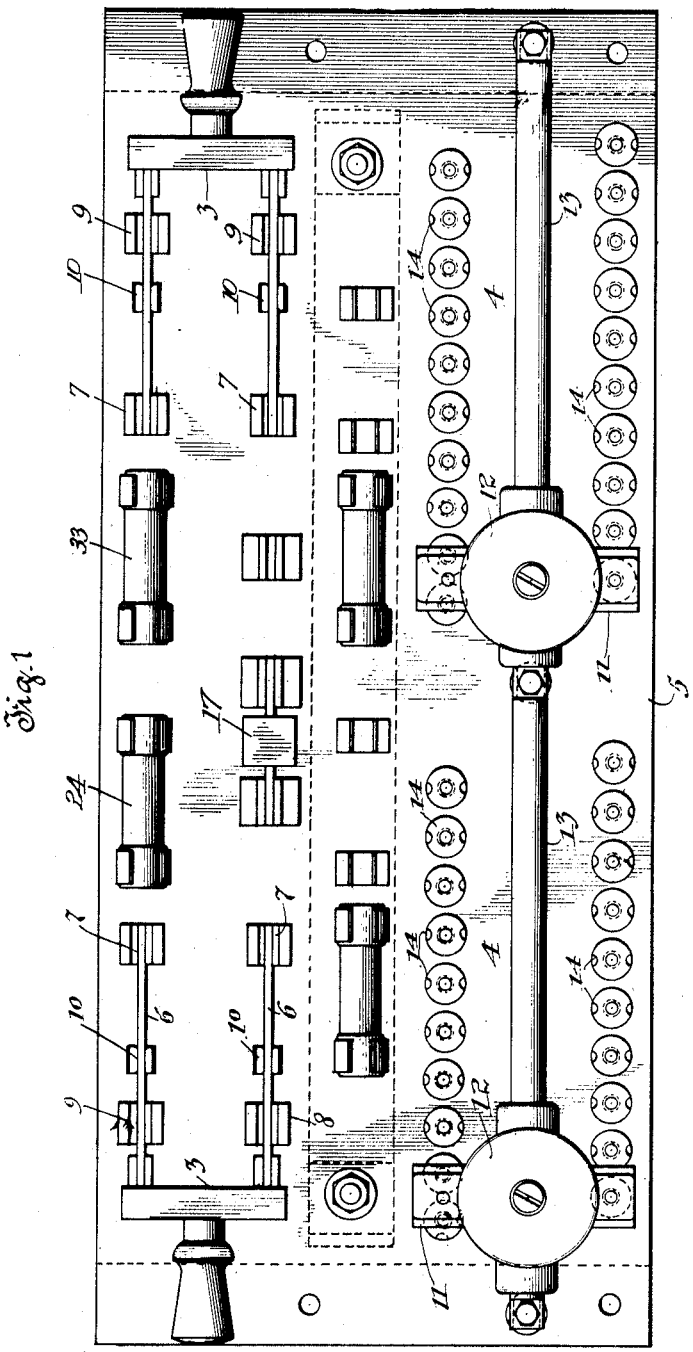

A. J. HORTON.
BATTERY CHARGING PANEL.
APPLICATION FILED MAY 26, 1913.

1,194,500.

Patented Aug. 15, 1916.
2 SHEETS—SHEET 1.

A. J. HORTON.
BATTERY CHARGING PANEL.
APPLICATION FILED MAY 26, 1913.
1,194,500.
Patented Aug. 15, 1916.
2 SHEETS—SHEET 2.
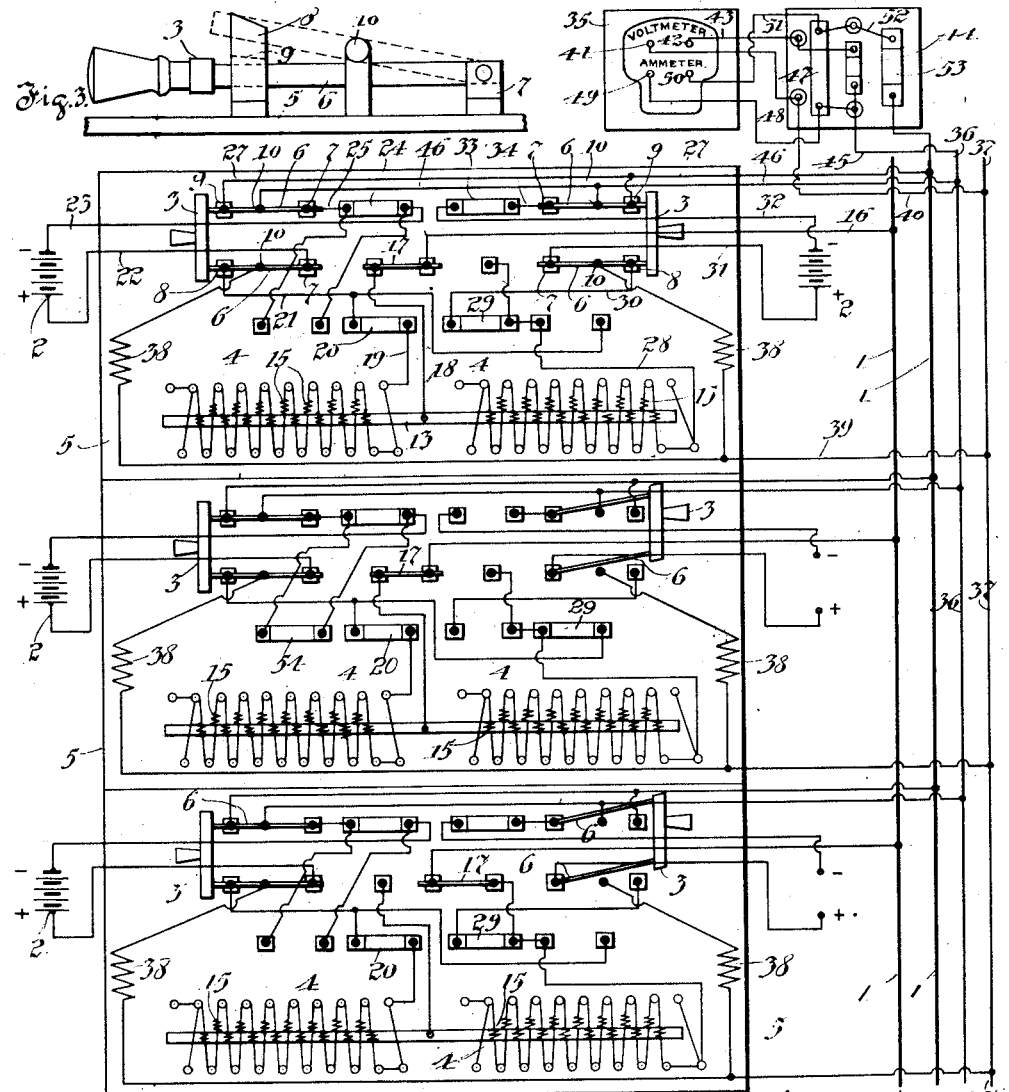
Witnesses
Arthur W. Carlson
Geo. B. James
Inventor
Albert J. Horton
By Edwin B. H. Tower Jr.
Atty.

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

BATTERY-CHARGING PANEL.

1,194,500.  Specification of Letters Patent.  Patented Aug. 15, 1916.

Application filed May 26, 1913. Serial No. 769,863.

*To all whom it may concern:*

Be it known that I, ALBERT J. HORTON, a citizen of the United States, residing at White Plains, in the county of Westchester and State of New York, have invented new and useful Improvements in Battery-Charging Panels, of which the following is a full, clear, concise, and exact description, reference being had to the accompanying drawing, forming a part of this specification.

My invention relates to improvements in panels adapted for use in controlling the charging of storage batteries, and it relates also to the circuit connections therefor.

Panels have been constructed heretofore having rheostats mounted thereon, in which the resistances have been divided into two sections, adapted to be connected either in series or parallel, for the purpose of varying the ohmic resistance and current-carrying capacity of the rheostat to suit varying requirements.

One object of my invention is to provide an improved panel wherein a pair of rheostats are employed, together with suitable switches and other adjuncts which permit each rheostat to be employed in controlling the charging of a storage battery independently of the other, said rheostats being adapted to be connected either in series or parallel, however, and controlled by a single switch, whereby the effective range of control of the panel as a whole may be greatly increased when it is desired to meet special requirements.

In controlling battery charging heretofore, a single ammeter and voltmeter have sometimes been used to give the readings with respect to any one of the individual batteries being charged. If the operator inadvertently established the circuit connections from more than one battery to the voltmeter simultaneously, the only protection provided against the ensuing local short circuit, has been the usual fuses, which blow under such circumstances and have to be replaced. To obviate this difficulty, my invention has for another of its objects to provide improved voltmeter circuit connections in conjunction with the improved panel section referred to, whereby the resistance of the individual voltmeter circuits is increased, without affecting the accuracy of the readings, said increased resistance preventing damage due to the simultaneous establishment of the voltmeter circuits to more than one panel section, and preventing the blowing of the fuses in the voltmeter circuit.

Other objects of my invention are to provide an improved panel section wherein the various elements mounted thereon coöperate with each other in a novel manner to permit a convenient regulation and control of more than one battery or of batteries of widely different capacities, and to permit also the meter readings to be taken in a convenient manner without opening the main charging circuit or manipulating auxiliary switches or plugs as heretofore.

In the accompanying drawings, I have illustrated a preferred form of panel section and have illustrated circuit connections for a plurality of such panel sections. It is to be understood, of course, that the invention may be embodied in other forms.

Figure 1 is an elevation of said preferred form of panel section. Fig. 2 is a circuit diagram of a complete panel. Fig. 3 is a side elevation of a switch. Fig. 4 is a simplified diagram.

The general function of the controlling devices mounted on each panel section is to provide the operator with convenient means for connecting one or more storage batteries to the charging mains and to regulate the charging current supplied to each battery to substantially a constant value. The charging mains are indicated by the reference characters 1, 1. The storage batteries 2 are adapted to be connected to said charging mains in parallel with each other, the circuit to each battery being controlled by a suitable switch 3. The charging current for each battery may be regulated by a suitable rheostat 4. The switch 3, rheostat 4, and other adjuncts hereinafter described, such as fuses, blade contacts, etc., are mounted preferably in duplicate on a common supporting insulating base 5. Said base and the parts carried thereby, constitute a panel section, the complete panel being made up preferably of a plurality of such sections; all of the panel sections being similar and interchangeable, whereby a unit construction is provided. This unit construction of the panel as a whole is described more fully and claimed in my co-pending application, Serial No. 778,844 filed July 14, 1913. The switch 3 may assume various forms. For the purpose of illustration, I have disclosed a switch which I have described and claimed in my co-pending application, Serial No. 763,581, filed June 30, 1913. Accordingly, I have described said switch in the present case only very briefly, as the specific form of switch is not material to the present invention except in so far as said switch is adapted to perform the functions hereinafter described. The switch illustrated comprises a pair of knife blades 6, each of which is pivotally mounted in hinge clips 7. Said blades are adapted to contact with a pair of main contact clips 8, 9, the former being longer than the latter, whereby the knife blades may be moved to such a position that one of them is in contact with its coöperating clip, while the other is not. Said position may be termed the intermediate position (see dotted lines, Fig. 3). Auxiliary contacts or meter contacts 10 are also provided. Said auxiliary contacts do not engage the knife blades when the latter are in their normal open or closed position, but engage them only when they are in said intermediate position. As will be apparent from Fig. 1, there are two such switches mounted on the supporting base 5, the same reference characters being employed to indicate corresponding parts.

The rheostat 4 may be of any suitable type and is illustrated as comprising a sliding contact 11 which carries a suitable handle or knob 12, said contact sliding on the conducting rod 13 and being adapted to bridge the various contacts 14 which are arranged in a double row and connected to suitable resistances 15, as shown in the diagram. The right hand and left hand valves of each panel section are normally entirely independent of each other and each is adapted to control the charging of a storage battery. The upper one of the three panel sections illustrated diagrammatically in Fig. 2, indicates the circuit connections when two batteries are being charged independently. The circuit connections for the left hand battery 2 may be traced as follows:—from the positive main 1, through conductor 16, blade contact 17, conductor 18, conducting rod 13, sliding contact 11, resistance 15, conductor 19, fuses 20, conductor 21, contact 8, knife blade 6, lower hinge clip 7, conductor 22, to the positive terminal of the storage battery 2. From the negative terminal the circuit continues through conductor 23, fuse 24, conductor 25, upper hinge clip 7, upper knife blade 6, contact 9, conductor 27, and back to the negative main 1.

The circuit for the right hand half of the panel section is the same as that previously described, down to the rheostat, the circuit branching off at this point and returning through the right hand resistances 15, conductor 28, fuse 29, conductor 30, to switch contact 8, lower knife blade 6, hinge clip 7, conductor 31, to the positive terminal of the right hand storage battery and from the negative terminal thereof through the conductor 32, fuse 33, conductor 34, hinge clip 7, upper knife blade 6, contact 9, and thence to the common conductor 27, returning to the negative main 1.

In order to determine the battery voltage and the current being supplied thereto at any time, a voltmeter and ammeter may be provided, which instruments may be combined in the form of a single meter 35, if desired, the latter being mounted on an independent panel section in the manner described in my aforesaid co-pending application, Serial No. 778,844. Conductors 36 and 37, connect with said meter 35, as does also the negative main 1, whereby the meter circuits may be established from any panel section at will, said conductors being in some cases in the form of bus bars to which suitable connections lead from each panel section. The switches 3 (see also Fig. 3) are used to establish both the voltmeter and ammeter circuit connections and they may also be used to establish the voltmeter circuit alone. For example, assume that the left hand battery 2 is to be connected to the upper panel section just described. The left hand switch 3 is normally open. Before closing said switch completely to connect said battery to the charging mains, the operator closes it far enough to permit the knife blade 6 to contact with the auxiliary contacts 10 only, thereby establishing a circuit from the battery to the voltmeter, which circuit may be traced as follows:—from the positive terminal of the battery, through conductor 22 to hinge clip 7, lower knife blade 6, lower auxiliary contact 10, through resistance 38 and conductor 39 to the bus bar 37; thence through conductor 40 connected to the upper end of said bus bar, to the voltmeter terminals 41 and 42; returning through conductor 43 and fuse 44 to conductor 45, and thence through bus bar 36, conductor 46, upper auxiliary contact 10, knife blade 6, hinge clip 7, conductor 25, fuse 24 and conductor 23, to the negative side of the battery.

If the operator sees from the deflection of the voltmeter needle that the battery has been properly connected to the line, said deflection giving him also the battery voltage, he then closes the switch 3 a little further, (see dotted line position in Fig. 3,) whereupon one knife blade 6 contacts with its main contact 8, which is longer than the corresponding main contact 9, the main circuit remaining open at said latter contact, but being closed through the auxiliary contact 10, whereupon the ammeter is included in series in the circuit. With the ammeter circuit established, the voltmeter circuit also remains established and the latter may be traced in the same manner as heretofore. The ammeter circuit may be traced through the same conductors as is the case where the switch is completely closed, except that in tracing the return circuit from the battery to the negative main, the ammeter is included in series, having one terminal connected to the upper auxiliary contact 10, and the other to the main contact 9. Said return circuit may be traced as follows:—from the battery 2, through conductor 23, fuse 24, conductor 25, hinge clip 7, knife blade 6, auxiliary contact 10, conductor 46, bus bar 36, conductor 45, around shunt 47, through conductor 48 to ammeter terminals 49, 50, conductors 51, 52, fuse 53, to the negative main 1.

The operator may now close the main switch completely, thereby opening the circuits to the instruments at the auxiliary contacts 10. Whenever it is desired to take the meter readings, the operator merely moves the knife blades outwardly through a small angle, until they contact with the auxiliary contacts, the charging circuit remaining closed during this operation, as the long contact 8 remains in contact with its co-operating knife blade 6. In connection with the voltmeter circuit, it will be noted that a resistance 38 is connected therein. If only a single panel section were employed, said resistance would not be necessary. Where a number of panel sections are employed, however, having a single voltmeter and ammeter to give the readings of any one of them, the operator may inadvertently close the voltmeter circuits from two panels simultaneously. This would result in connecting two of the batteries in series and opposed to each other, whereby if the voltage of one battery greatly exceeds that of the other, the local short circuit would have impressed on it a voltage equal to the difference of the two battery voltages. The ensuing current would blow the fuses, which would thereupon have to be replaced. By providing the resistance 38 in each local voltmeter circuit, the fuses are prevented from blowing under circumstances such as described. In view of these individual resistances, the resistance of the volt meter is made less than it otherwise would be, whereupon accurate reading may be had of the voltage of any battery connected to any of the various panel sections. For a further understanding of this feature, and to make it easier to determine the connections from the voltmeter and ammeter to the individual batteries and switches, I have illustrated in Fig. 4 a simplified diagram, wherein two batteries are connected to the charging mains. It will be apparent that the number of batteries may be increased indefinitely, and the various circuits may be readily traced in view of the use of the same reference characters previously employed.

The circuit connections for all of the panel sections illustrated in Fig. 2, are the same as those described for the top panel section, where it is desired to charge two batteries independently from each panel section, one battery being regulated from each side of the panel section. It will be apparent that the meter circuit from any panel section, to the instruments which are common to all of said sections, may be established merely by actuating one of the switches 3 in the proper manner. A single voltmeter and ammeter thereby serves for the entire panel made up of any desired number of panel sections.

Although the two rheostats on each panel section are normally entirely independent of each other, the circuit connections are so arranged that said rheostats may be very quickly and conveniently connected, either in series or in parallel with each other, whereby a rheostat is formed having a capacity different from that of either rheostat alone. By connecting said rheostats in multiple, the resistance thereof may be reduced to effect an increase of capacity, whereby a single battery of large capacity may be charged. By connecting them in series, the available resistance may be increased, whereby a single battery of small capacity may be charged. In order to connect said rheostats in multiple, all that is necessary is to change the position of certain of the fuses, as shown in the middle panel section in Fig. 2. For example, the fuse 33 is withdrawn, thereby opening the circuit to the corresponding switch 3 and a fuse 54 is inserted in the position shown. The fuse 29 is withdrawn and reinserted in position immediately to the right of its former position. With these changed connections, the two rheostats are connected in multiple and are controlled by the left hand switch 3, said rheostats being adapted to control the charging of a single battery. The circuit connections to said battery may be readily traced in view of their similarity to the circuit connections traced in detail above, the only changes being those needed to cause the current to divide and flow through the two rheostats in parallel. The voltmeter and ammeter reading may be taken in the same manner as that heretofore described.

In order to connect the two rheostats in series for the purpose of charging a single battery of small capacity, the circuit connections are changed as shown in the lowermost panel section in Fig. 2. Under these circumstances, the fuses are located in the same positions as in the upper panel sections, the only change required being to remove the blade contact 17, from its clips and insert it in those immediately to the right thereof. This single change effects the series connection which is plainly indicated on the diagram and may be readily traced.

With the panel sections constructed as shown, it will be seen that the change from the series to the parallel connection on the two rheostats may be accomplished in a very simple and convenient manner, said change permitting a considerable increase in the effective range of control of the panel section as a whole. Furthermore, the combined rheostats are controlled by a single switch, the effect being that of a single rheostat.

It is to be understood, of course, that the invention is not limited to the details of construction described an illustrated, as said constructions have been selected in the main as typical of devices adapted to perform the desired functions. Neither do I limit myself to the details of the circuit connections except in so far as limitations are imposed in the appended claims. Accordingly, I desire to cover in said claims suitable equivalent means for performing the desired functions and falling within the scope of the appended claims.

What I claim as new and desire to secure by Letters Patent of the United States is:

1. In combination, a plurality of storage batteries, a voltmeter common thereto, means for establishing and interrupting the voltmeter connections of each of said batteries and current reducing means included in the voltmeter connections of each of said batteries to be interposed between its respective battery and any other battery connected at the same time to said voltmeter.

2. The combination with a plurality of independently operable rheostats each having a switch for controlling the circuit thereto, of means for connecting said rheostats in series or in parallel to permit of their operation as a unit and their control by a single one of said switches.

3. A battery charging panel comprising a supporting base having charging rheostats and switches mounted thereon in duplicate to form two sets of control devices, each set being normally independent of the other, and contacts on said base electrically connected to said rheostats and having manually operable means for varying the circuit connections to said rheostats whereby the latter may be employed jointly in regulating the charging of a battery of a different capacity from that which either alone is capable of regulating.

4. A battery charging panel having rheostats, switches, clips for blade contacts, and fuses, said elements being arranged in two sets which are normally independent of each other, and a blade contact adapted to coöperate with either of a plurality of pairs of said clips to permit the use of said panel as a single unit.

5. A panel section having duplicate sets of devices thereon, each set comprising a knife blade switch, main contacts therefor, auxiliary meter contacts therefor, a manually adjustable rheostat, cartridge fuses, clips therefor, additional clips for a blade contact, and a blade contact adapted to operate with either of two alternate pairs of said clips, certain of said fuses being adapted also to bridge alternative pairs of clips.

6. In combination, a plurality of charging rheostats, a plurality of switches therefor, said rheostats and switches being mounted so as to control the charging of a corresponding number of storage batteries, and a voltmeter and ammeter common to all of said batteries, said switches being arranged to establish the circuits from said instruments to the individual batteries without opening the charging circuits.

7. A control panel comprising a meter panel and one or more charging panels, each of said charging panels including a charging rheostat and a control switch for a charging circuit, said control switch having auxiliary contacts for establishing a temporary connection to an instrument on said meter panel.

8. In combination, a plurality of charging rheostats, a switch associated with each to control a charging circuit, said rheostats and switches being arranged to control the charging of a corresponding number of storage batteries and a common voltmeter for all of such batteries, said switches having contacts to establish circuits from said voltmeter to the individual batteries without interruption of their respective charging circuits.

9. In combination, a plurality of charging rheostats, a plurality of switches therefor, said rheostats and switches being mounted so as to control the charging of a corresponding number of storage batteries, a voltmeter and ammeter common to all of said batteries, said switches controlling the circuits from said instruments to the individual batteries, and a resistance in each individual circuit to the voltmeter to prevent damage due to the simultaneous establishment of more than one of said circuits.

10. In combination, charging mains, a plurality of storage batteries connected thereto, a charging rheostat connected in series with each battery, a voltmeter for determining the voltage of any of said batteries, and a conductor extending to said voltmeter, said batteries being connected to said conductor with a resistance between each battery and said conductor.

11. In combination, a pair of mains, a storage battery, circuit connections from said battery to said mains, a switch for opening and closing said circuit, a charging rheostat between said battery and one of said mains, and a voltmeter and ammeter, said switch controlling also the circuits of said instruments and permitting said circuits to be established without opening the battery charging circuit.

12. In combination, mains, one or more storage batteries connected across said mains each in series with a charging rheostat, a switch for controlling the charging circuit to each battery, a voltmeter and an ammeter for said batteries, auxiliary contacts on each switch to which said voltmeter and ammeter are connected, whereby the circuit to said instruments may be established from any battery by manipulation of the corresponding switch and without opening the charging circuit, and a resistance between each switch and voltmeter to prevent a short circuit between said batteries.

In witness whereof, I have hereunto subscribed my name in the presence of two witnesses.

ALBERT J. HORTON.

Witnesses:
W. L. CULLY,
W. W. MILLER.